United States Patent [19]

Rau et al.

[11] Patent Number: 5,078,442
[45] Date of Patent: Jan. 7, 1992

[54] PORTABLE PERFORMANCE PLATFORM

[75] Inventors: Douglas Rau; Harland Blume, both of Owatonna; Arie Boers, Plymouth; Jerry Wenger, Owatonna, all of Minn.

[73] Assignee: Wenger Corporation, Owatonna, Minn.

[21] Appl. No.: 530,851

[22] Filed: May 30, 1990

[51] Int. Cl.⁵ .............................................. B60P 3/00
[52] U.S. Cl. .......................................... 296/26; 52/7; 52/66; 52/69; 52/70
[58] Field of Search ...................... 296/26; 52/6, 7, 66, 52/69, 70

[56] References Cited

U.S. PATENT DOCUMENTS

| 1,521,803 | 1/1925  | Dossenbach | 296/1.1 |
| 2,155,876 | 4/1939  | Stout      | 52/69   |
| 3,181,203 | 5/1965  | Wenger     | 52/6    |
| 3,217,366 | 11/1965 | Wenger     | 52/6    |
| 3,258,884 | 7/1966  | Wenger     | 52/6    |
| 3,417,518 | 12/1968 | Jaffe      | 52/7    |
| 3,620,564 | 11/1971 | Wenger     |         |
| 3,866,365 | 2/1975  | Honigman   | 52/70   |
| 4,232,488 | 11/1980 | Hanley     | 296/26 X |
| 4,535,933 | 8/1985  | Kuiper     | 296/26 X |

FOREIGN PATENT DOCUMENTS

| 644431  | 10/1928 | France . |        |
| 1-97139 | 8/1989  | Japan    | 296/26 |
| 302346  | 10/1954 | Switzerland . |   |
| 012992  | of 1911 | United Kingdom . | |

Primary Examiner—Dennis H. Pedder
Attorney, Agent, or Firm—Dorsey & Whitney

[57] ABSTRACT

A portable performance platform for the performing arts is disclosed that, in the stowed configuration, can be transported along roads and highways, and, in its unfolded configuration, presents an extended performing area having an overhead canopy. The platform includes a chassis mounted on ground engaging wheels. A pair of spaced apart, upright standards are positioned along one side margin of the chassis. Each standard includes an articulated arm that can be shifted between a stowed position (for transport of the platform) and an extended position (when the platform is set up for a performance). The articulated arm includes two arm members, and panels are fixedly carried by each of the arm members. In the stowed position, the panels make up a top wall and a sidewall of a staging compartment, and, when the arms are in the extended position, the panels provide a canopy over the performing area.

10 Claims, 10 Drawing Sheets

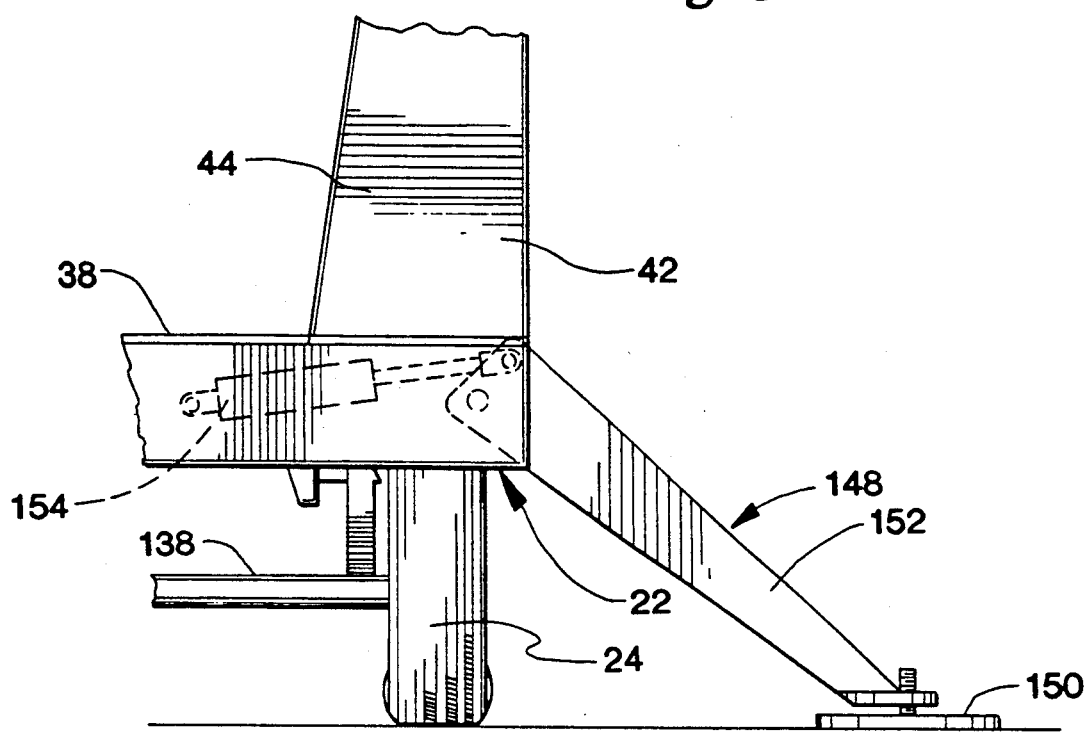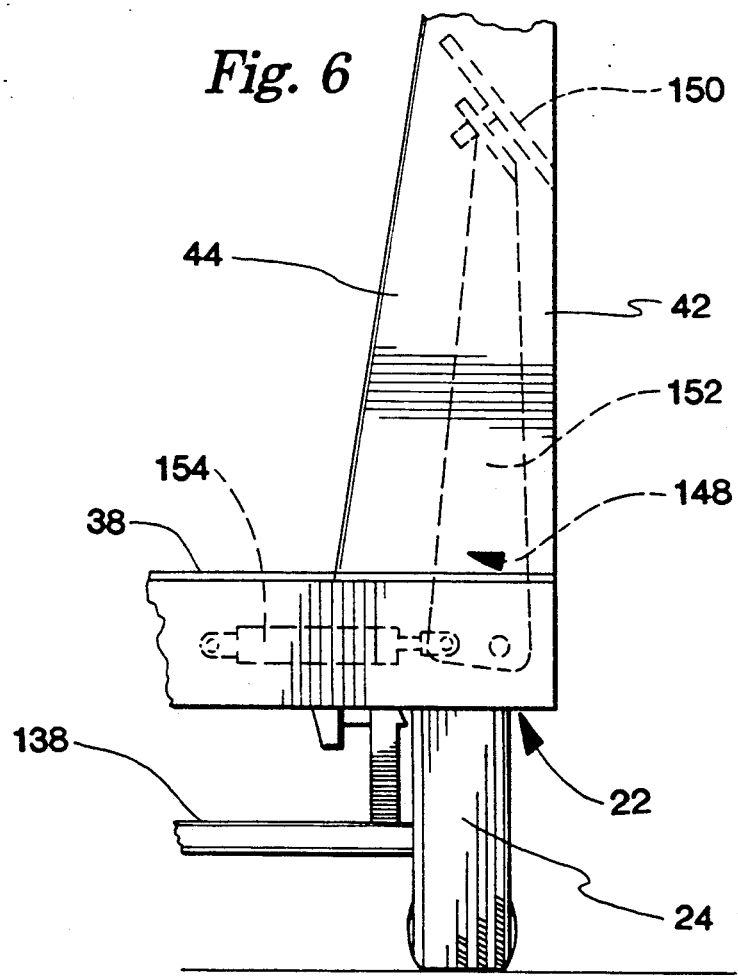

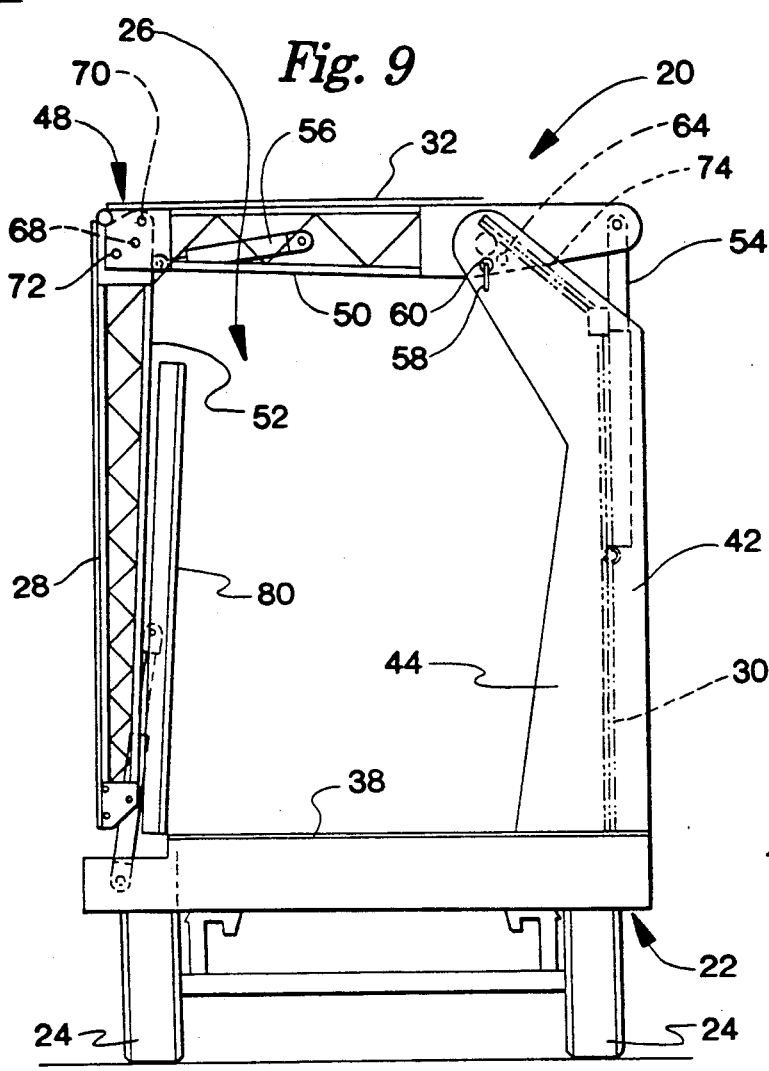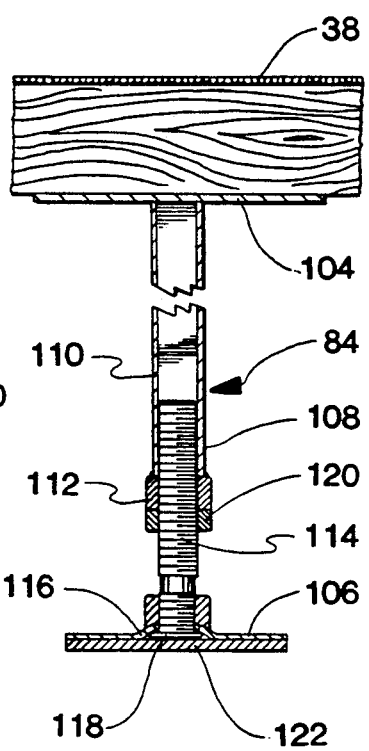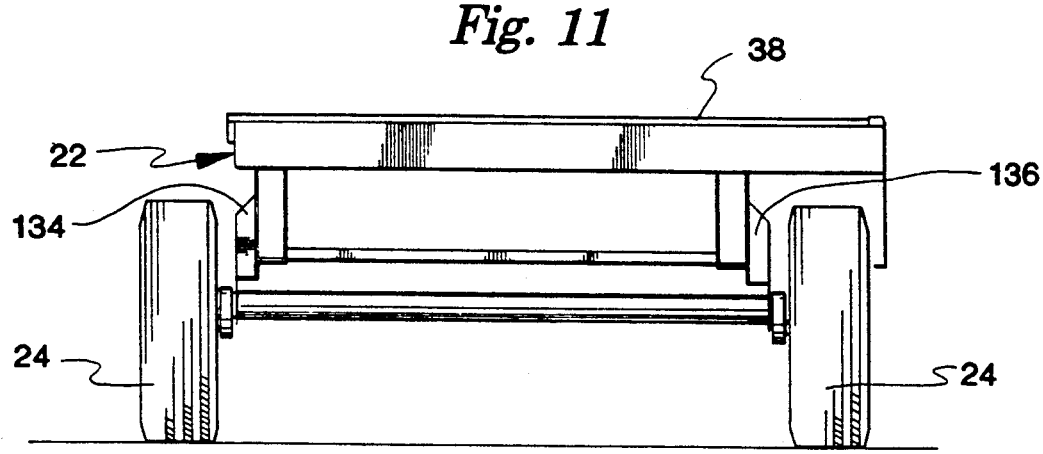

PORTABLE PERFORMANCE PLATFORM

TECHNICAL FIELD

This invention relates to mobile structures suitable for transportation along roads and highways. In particular, it pertains to a portable performance platform for the performing arts that, in its stowed configuration, can be transported along roads and highways by an automobile or truck, and which can be unfolded when it reaches it destination to present an extended performing area having an overhead canopy.

BACKGROUND ART

Portable staging centers that can be transported over the highway from one performing area to another are known. U.S. Pat. No. 3,620,564 owned by the assignee of this application discloses a self-propelled portable stage wherein one or both sidewalls of a chassis mounted staging compartment can be raised to provide an overhead canopy. With the sidewall raised, a staging apron can be pivoted downwardly underneath the canopy. Support arms extend from the canopy downwardly and inwardly to the unraised portion of the near vehicle sidewall to support the canopy in its raised position.

The need to support the canopy from the near sidewall in prior art portable stages effectively reduced the floor area of the stage. In particular, the side to side width of the stage floor in prior portable stages was confined to the length between the front wall and rear wall of the staging compartment. A portable performance platform that was capable of supporting an overhead canopy from the far side wall, rather than the near sidewall, of the staging compartment would be a decided advantage in terms of the floor space presented by the platform.

SUMMARY OF THE INVENTION

The portable performance platform in accordance with the present invention includes a wheel mounted chassis adapted for towing by an automobile or truck. A staging compartment is mounted on the chassis that includes front and rear end walls, opposed sidewalls, an overhead roof, and a compartment floor. A platform apron is pivotally mounted along one side margin of the chassis. A pair of upright standards are mounted on the opposed side margin of the chassis, and a first sidewall is vertically, fixedly supported by the standards. Each standard supports an articulated support arm having a middle section pivotally carried by the standard, and a terminal section pivotally carried by the middle section. The overhead roof is carried between the two middle sections of the articulated support arms, and a second sidewall panel is carried by the terminal sections of the articulated support arms. In the performing configuration, the apron of the portable performance platform is pivoted downwardly so as to be flush with the compartment floor, the articulated support arms are raised, and the front and rear walls are pivoted outwardly. Stage floor extensions can optionally be attached to the lowered apron and compartment floor.

BRIEF DESCRIPTION OF THE DRAWINGS

FIGS. 2a and 2b are to be joined.

FIGS. 2a and 2b, is a top plan view of the portable performance platform in accordance with the present invention with parts removed for clarity;

FIG. 3 is a fragmentary sectional view taken along line 3—3 of FIG. 2a;

FIG. 5 is an enlarged, fragmentary, rear elevational view of the platform with the rear right outrigger extended;

FIG. 6 is similar to FIG. 5, but with the outrigger retracted to the stowed position and depicted in phantom lines;

FIG. 9 is similar to FIG. 4, but with the apron and canopy in their stowed positions;

FIG. 10 is an enlarged, fragmentary sectional view of a support leg;

FIG. 11 is a simplified, rear elevational view of the chassis;

DETAILED DESCRIPTION OF THE DRAWINGS

Figure 1:
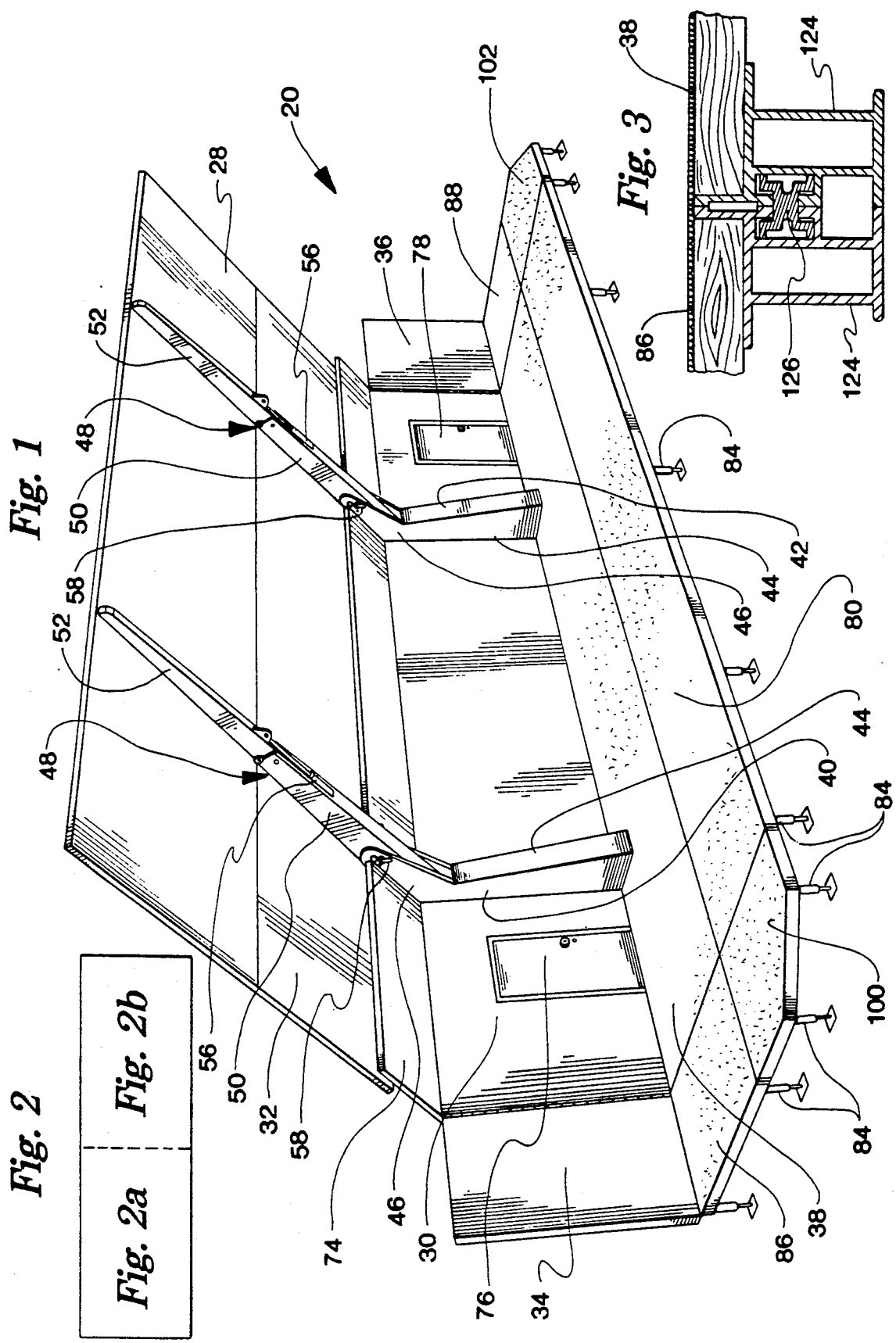
FIG. 1 is a perspective view of a portable performance platform in accordance with the present invention with the canopy and apron fully extended to the performing configuration and having four stage floor extension panels attached to the floor and apron.
Figure 2:
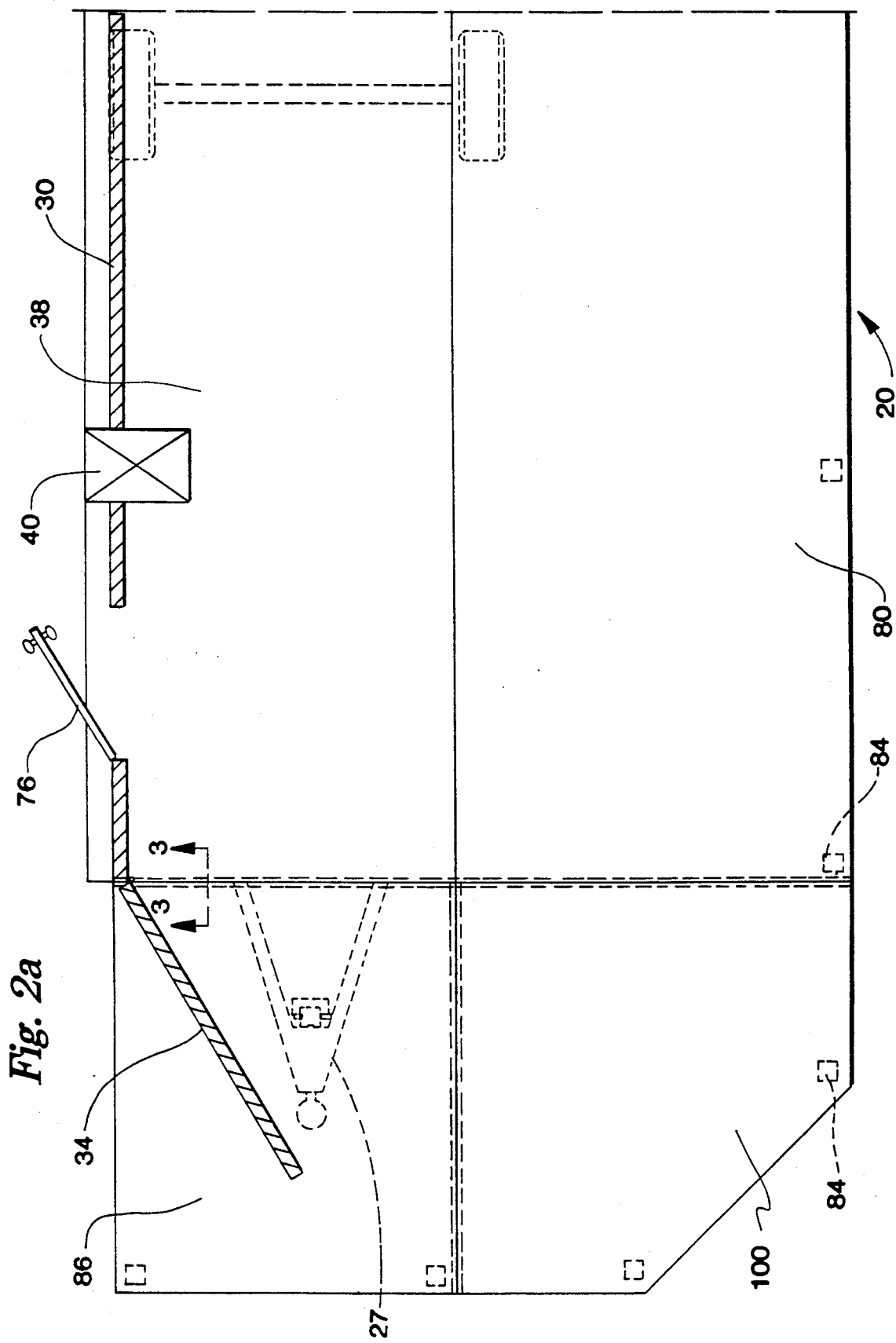
FIG. 2 is a schematic composite depicting how

Referring to the drawings, a portable performance platform 20 in accordance with the present invention broadly includes chassis 22 supported by ground engaging wheels 24, and staging compartment 26 carried by the chassis 22. A trailer hitch 27 is fixedly attached to the chassis 22 for towing attachment of the platform 20 to a towing vehicle (not shown).

The portable performance platform 20 is depicted in its stowed configuration in FIG. 9, and in its fully set up configuration in FIG. 1. In the stowed configuration, the staging compartment 26 includes spaced sidewalls 28, 30, top wall 32, front and rear end walls 34, 36 (not shown in FIG. 9) and main stage floor 38. A pair of spaced apart, upright standards 40, 42 are fixedly attached to the chassis 22 along one side margin of the chassis. The sidewall 30 is fixedly carried by the standards 40, 42, and comprises the performing area back wall when the platform 20 is in its fully set up configuration.

The standards 40, 42 each include an upright post member 44, and an inwardly angled cantilever arm 46. An articulated canopy support arm 48 is pivotally carried by each cantilever arm 46. Each support arm 48 includes lower arm member 50 and an upper arm member 52 pivotally coupled to the lower arm member.

A first extensible piston and cylinder assembly 54 extends between the midportion of the post 44 of each standard 40, 42 and the lowermost end of the lower arm member 50 of the articulated support arm 48 associated with the standard. A second piston and cylinder assembly 56 extends between each lower and upper arm member 50, 52.

A first locking pin 58 is removably received within locking pin aperture 60 in each cantilever arm 46. The locking pin apertures 60 in the cantilever arms 46 are alignable with a selected one of locking pin apertures 62, 64 in the lower portion of lower arm member 50 of each articulated support arm 48. A second locking pin 66 is removably received in a selected one of locking pin apertures 68, 70 in the upper arm member 52 of each articulated support arm 48. The upper arm member locking pin apertures 68, 70 are alignable with a locking aperture 72 in the upper end of the lower arm member 50.

The top wall 32 of staging compartment 26 is fixedly carried by the lower arm members 52 of cantilever arm 46. Likewise, the sidewall 28 is fixedly carried by the upper arm members 52 of the articulated support arm 48. Referring to FIG. 1, the front end wall 34 is hingeably carried at the forward margin of the sidewall 30, and the rear end wall 36 is hingeably carried by the trailing margin of the sidewall 30. A sloped roof edge panel 74 is fixedly carried by the cantilever arms 46 of upright standards 40, 42. Doors 76, 78 are provided in the sidewall 30.

An apron 80 is hingeably carried along the side margin of chassis 22 opposite the side margin connected to the standards 40, 42. At least one extensible piston and assembly 82 extends between the chassis 22 and the apron 80. Referring to FIG. 1, a plurality of adjustable support legs 84 are arranged along the outer margin of the apron 80 to support the apron 80 flush with the main stage floor 38. Extension floor panels 86, 88 can be detachably positioned flush with main stage floor 38, and extension floor panels 100, 102 can be detachably positioned flush with the apron 80.

Referring to FIG. 10, the support leg 84 includes upright support flange 104, lowermost foot 106, and extensible rod 108 extending between the flange and foot 104, 106. Rod 108 includes tubular sleeve 110 having cuff nut 112 fixedly attached to the lower end of the sleeve. Upright threaded post 114 is threadably received by cuff nut 112. Jam nut 116 is carried by the threaded post 114. Threaded post 114 is received through apertured indent 116 in the foot 106 of the support leg 84. A lowermost flange 118 is captured within the apertured indent 116. Tightening nut 120 is carried at the lower end of the threaded post 114. Nonskid sole material 122 is carried at the bottom of the foot 106.

Figure 3:
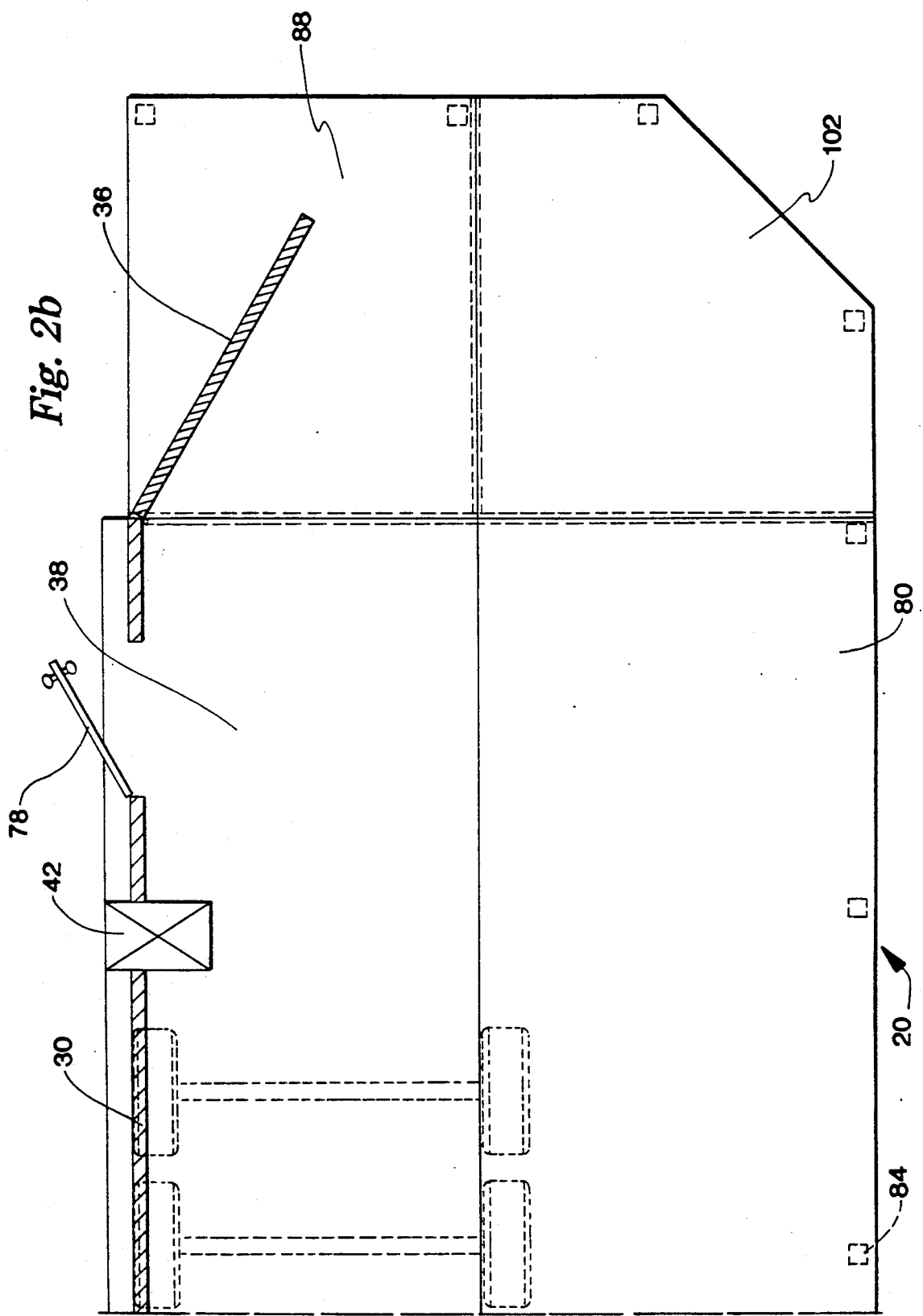

The structure for detachably coupling the floor extension panels 86, 88, 100, 102 to the main stage floor 38 and apron 80 is depicted in FIG. 3. An extruded panel 124 is carried along the adjoining margins of the main stage floor 38, apron 80, and floor extension panels 86, 88, 100, 102. An H-shaped in cross section spline 126 is slidably received by the channels 124 when the respective adjoining margins of the main stage 38, apron 80, and extension panels 86, 88, 100, 102 are aligned with each other as shown in FIG. 3, locking the adjoining margins together.

Figure 12:
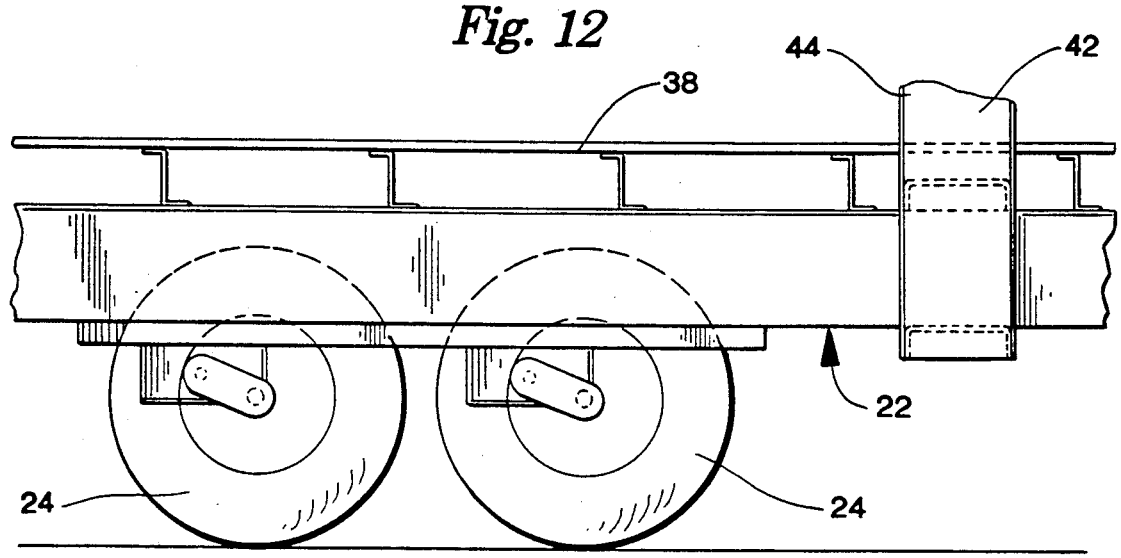
FIG. 12 is a fragmentary, right side elevational view of the chassis.
Figure 13:
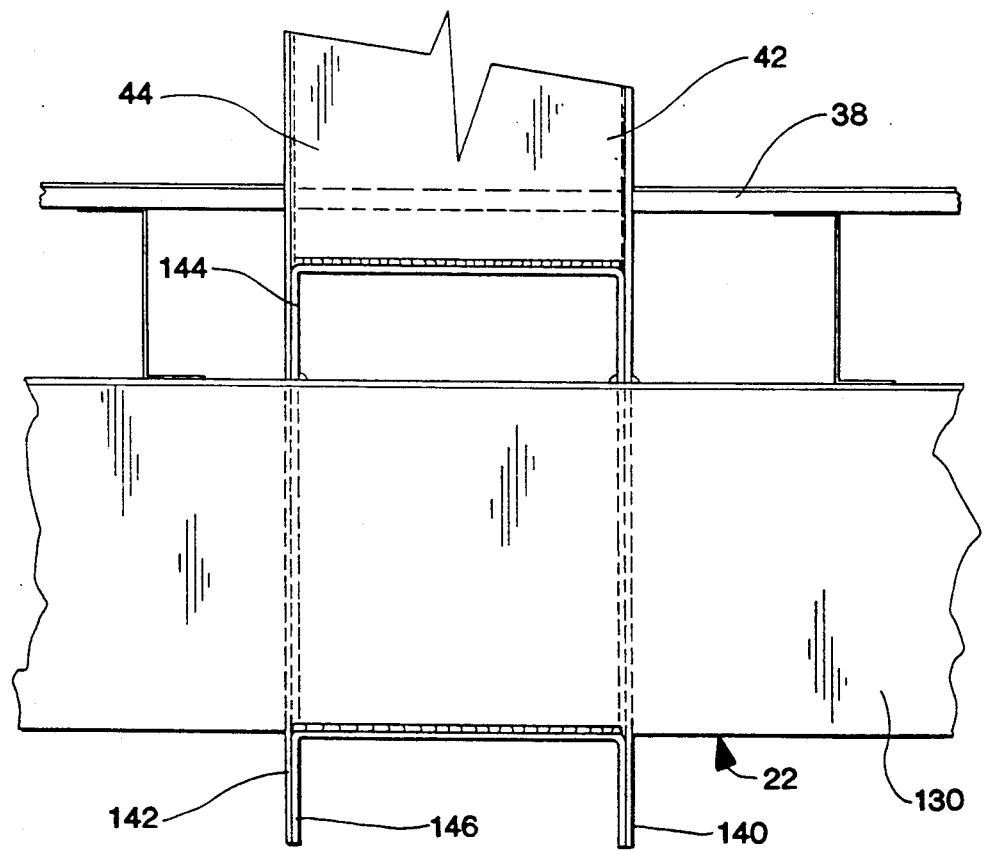
FIG. 13 is a fragmentary, enlarged, elevational view of one of the upright standards depicting its connection to the chassis.
Figure 14:
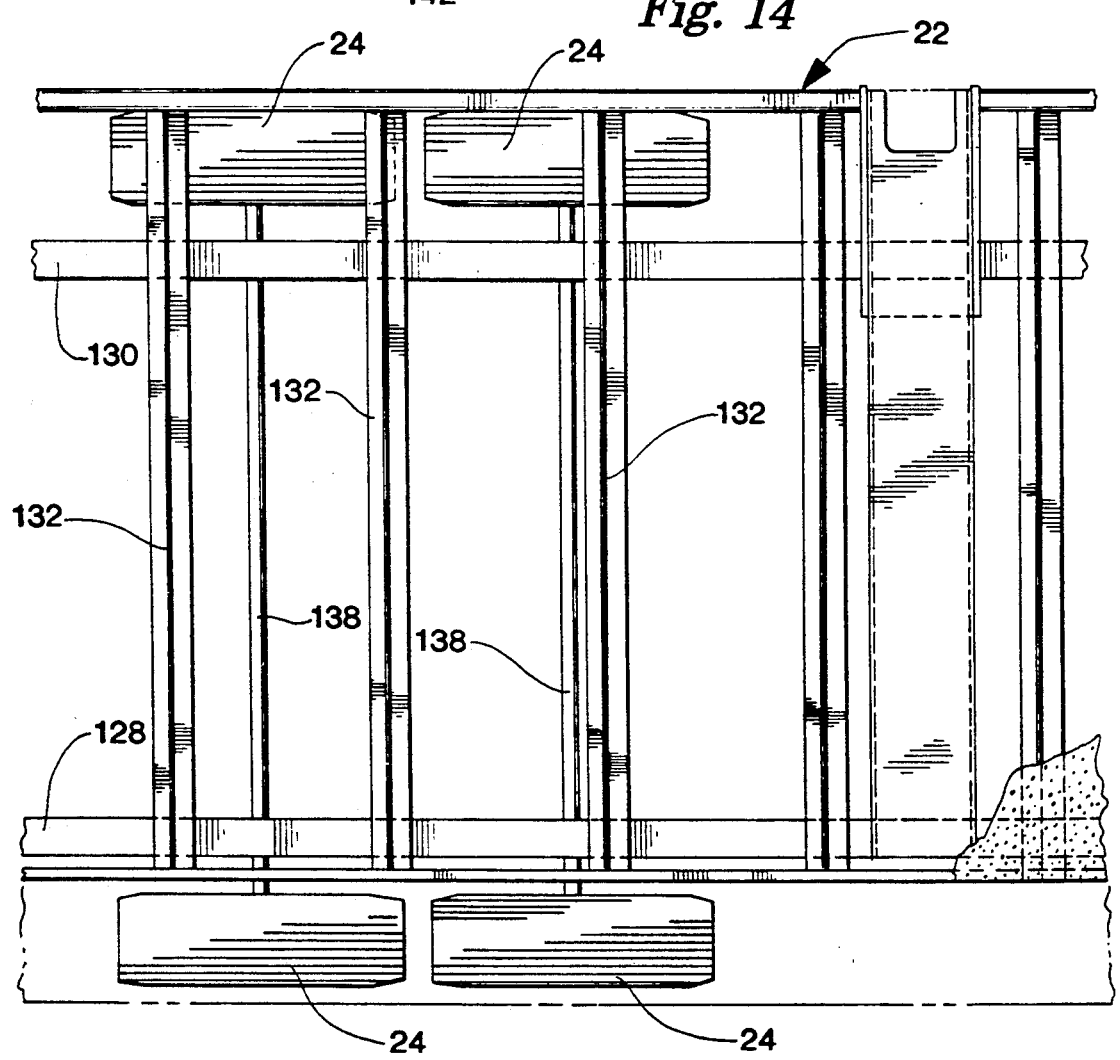
FIG. 14 is a fragmentary, top plan view of the chassis.

Referring to FIG. 14, the chassis 22 includes spaced apart longitudinal frame channels 128, 130, and a plurality of transverse channels 132 extending between the longitudinal channels 128, 130. Referring to FIG. 11, wheel mounts 134 are attached to the longitudinal channels 128, 130, and torsion bar axles 138 are received within respective wheel mounts 134. As is best seen in FIGS. 12 and 13, staging floor 38 is supported on the transverse channels 132.

Figure 15:
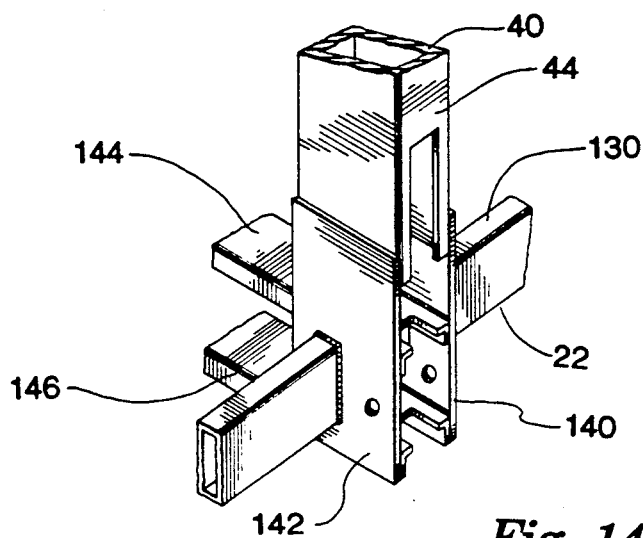
FIG. 15 is an enlarged, fragmentary, perspective view of one of the upright standards depicting its connection to the chassis.

The attachment of each of the upright standards 40, 42 to the chassis 22 is depicted in FIGS. 13 and 15. Opposed, spaced apart mounting plates 140, 142 are fixedly carried at the lowermost end of each post 44 of the upright standards 40, 42. The longitudinal frame channel 130 is received through the mounting plates 140, 142, and the mounting plates 140, 142 are welded to the longitudinal channel 130. Upper and lower transverse standard support bars 144, 146 are welded to the mounting plates 140, 142, and as can be seen in FIG. 14, extend across the width of the chassis 22.

Referring to FIGS. 5 and 6, a retractable outrigger 148 is associated with each upright standard 142. The outriggers 148 are pivotally coupled to chassis 22 and include a ground engaging foot 150 received by arm 152. An extensible piston and cylinder assembly 154 extends between the chassis 22 and each outrigger arm 152.

In operation, the portable performance platform 20 can be stowed in the configuration of FIG. 9 for overland transportation to a performance site. Upon reaching the destination, the platform 20 can be set up in the configuration of FIG. 1 by extending the first and second piston and cylinder assemblies 54, 56 to raise the articulated support arms 48. The top wall 32 and sidewall 28 form a platform canopy over the performance floor space. The apron 80 can then be pivoted downwardly with the assistance of piston and cylinder assembly 82, and adjustable support legs 84 can be positioned at the leading margin of the apron 80. Extension panels 86, 88, 100, 102 are connected to the main stage floor 38 and apron 80 by aligning the adjoining margins of the floor, apron and extension panels, and slideably inserting splines 126 through the adjoining extruded channels 124. The front and rear end walls 34, 36 are swung outwardly. Outriggers 148 are extended downwardly to securely position the platform relative to the ground.

Figure 4:
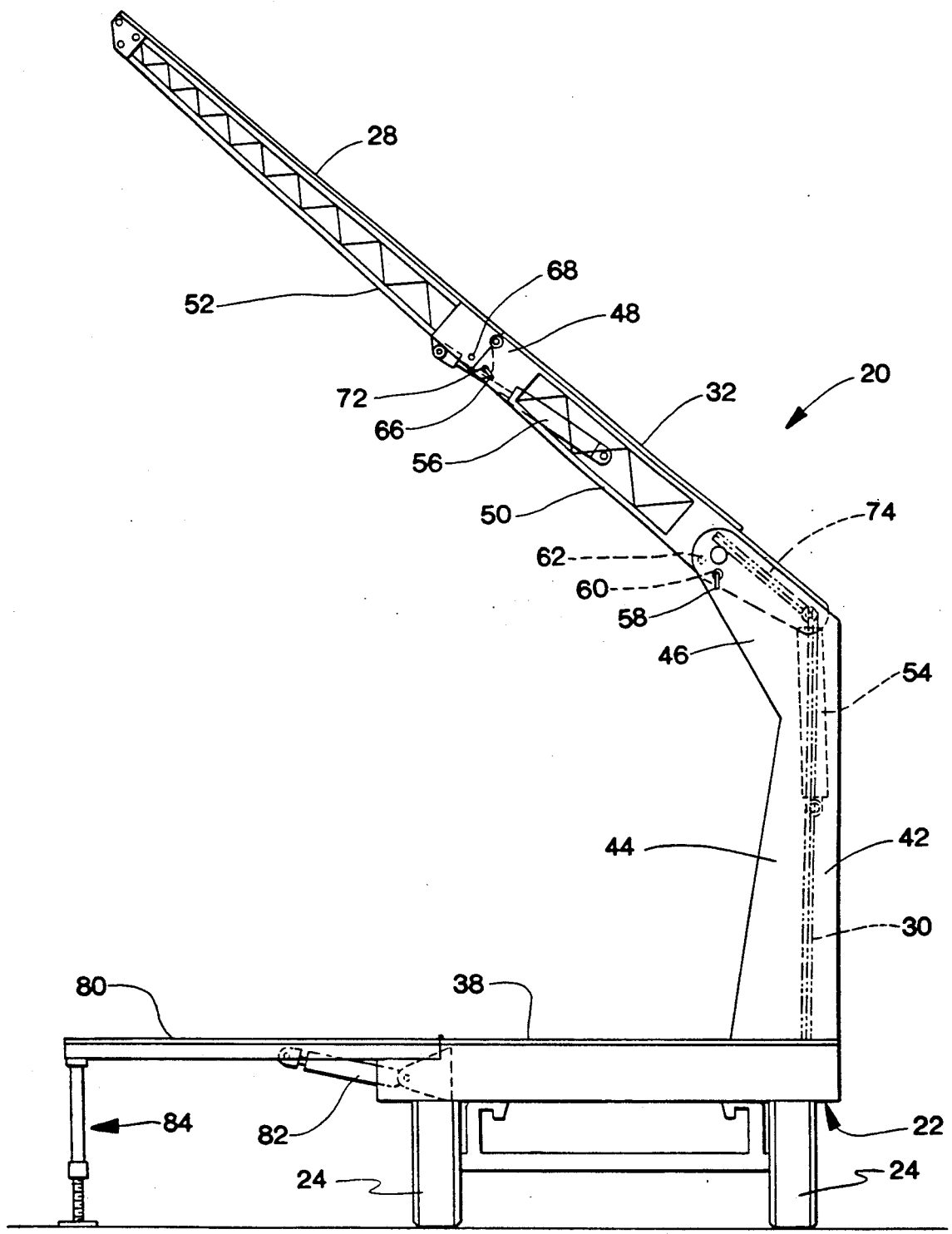
FIG. 4 is a rear elevational view of the platform.
Figure 7:
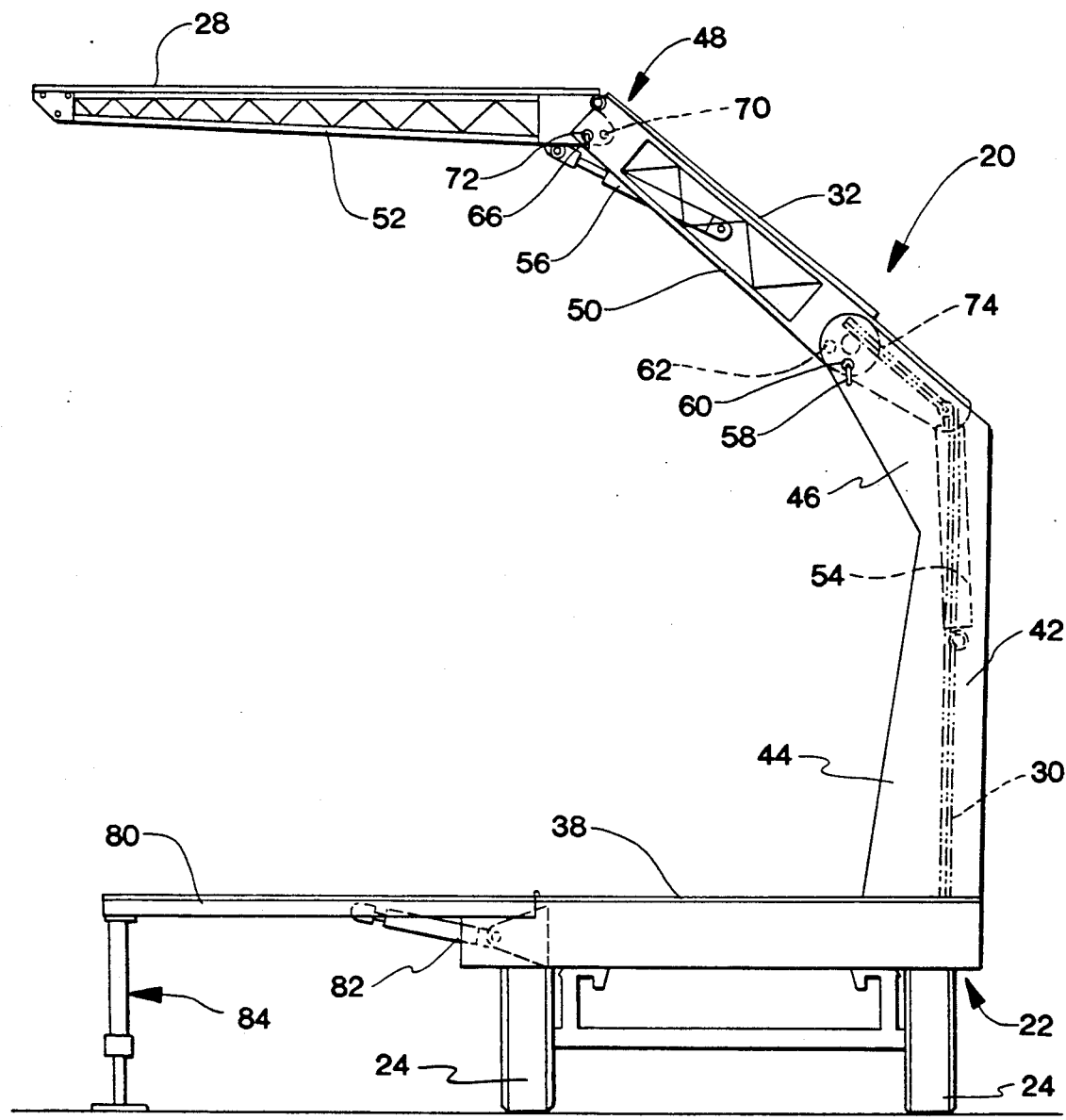
FIG. 7 is similar to FIG. 4 but with the canopy positioned in an alternative configuration.
Figure 8:
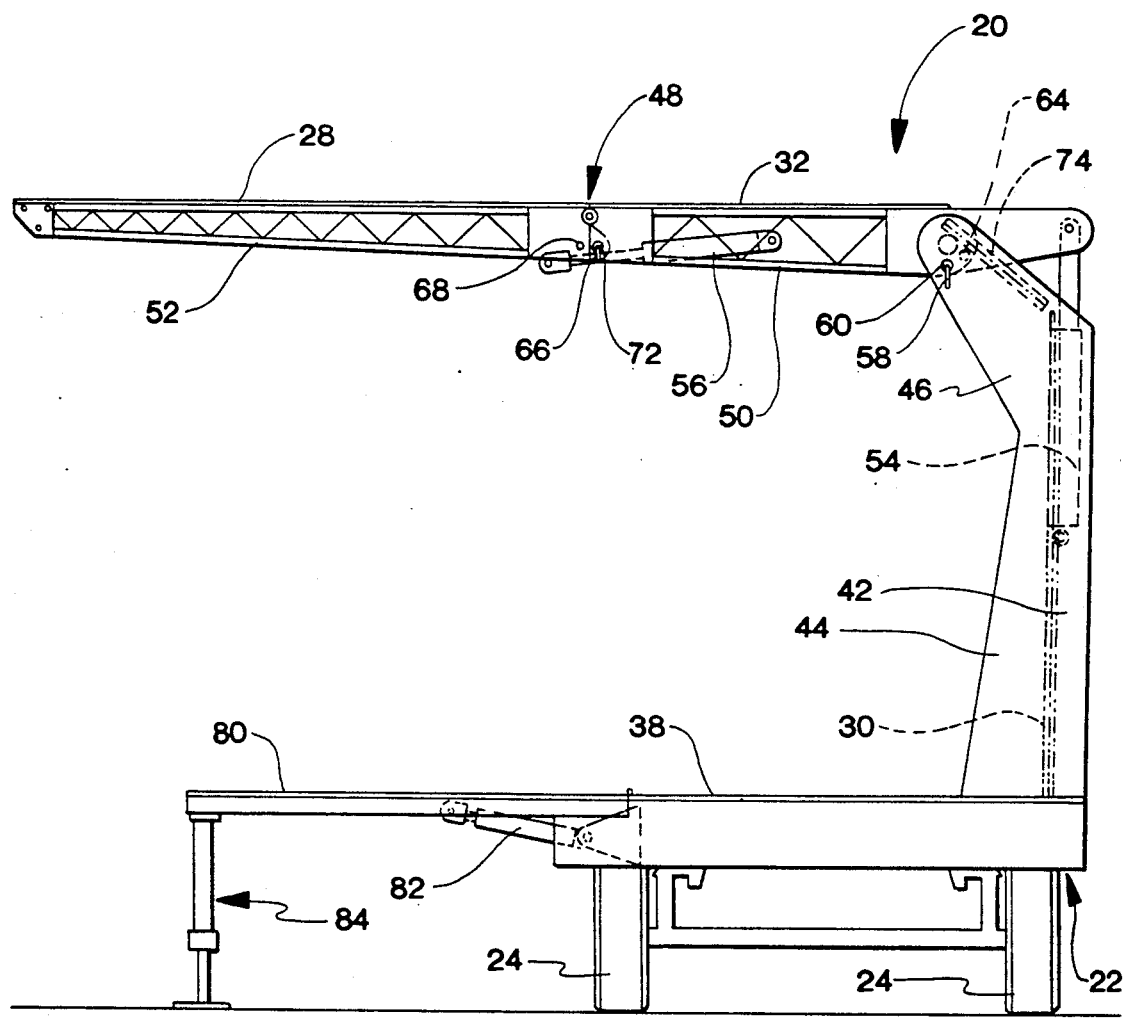
FIG. 8 is similar to FIG. 4, but with the canopy positioned in a second alternative configuration.

FIGS. 4, 7 and 8 depict alternate configurations for the platform canopy. When the platform canopy is in the desired configuration, locking pins 58 and 66 are received through respective locking pin apertures to securely maintain the roof in the desired position.

The weight of the platform canopy is transferred through the upright standards 40, 42 and distributed across the chassis 22 by the transverse support bars 144, 146. With all of the support for the canopy transferred through the far sidewall 30 of the platform 20, there are no canopy supporting obstructions required on the floor 38 or apron 80. The unique mounting of the canopy allows for maximum flexibility in configuring the platform 20 and maximizing the available performance floor space.

We claim:

1. A portable platform for the performing arts or the like comprising:
   a chassis having first and second side margins;
   ground engaging wheels operably carried by the chassis for overland transportation of the chassis;
   upright support means operably coupled to said chassis, said upright support means comprising weight bearing standards operably coupled to said chassis along said first side margin, said weight bearing standards each comprising an upright post member including an uppermost, inwardly angled cantilever arm;

articulated panel means operably coupled to said support means including a first panel operably, pivotally coupled to said support means and a second panel operably, pivotally coupled to said first panel; and means for selectively shifting said panel means between a stowed position wherein said first panel comprises a top wall and said second panel comprises a sidewall, and a performing position wherein said first and second panels comprise an overhead canopy extending over said chassis.

2. The invention as claimed in claim 1, including first locking means operably coupled to said articulated panel means for selectively, fixedly positioning said first panel at one of a plurality of possible angles relative to said upright support means.

3. The invention as claimed in claim 2, including second locking means operably coupled to said articulated panel means for selectively, fixedly positioning said second panel at one of a plurality of possible angles relative to said first panel.

4. The invention as claimed in claim 1, including locking means operably coupled to said articulated panel means for selectively, fixedly positioning said second panel at one of a plurality of possible angles relative to said first panel.

5. The invention as claimed in claim 1, including a back wall carried by said upright support means along said first side margin.

6. The invention as claimed in claim 5, including first and second wall panels operably, hingeably coupled to said back wall, said wall panels shiftable between a stowed position wherein they comprise opposed end walls, and a performance position wherein said wall panels comprise extensions to said back wall.

7. The invention as claimed in claim 1, said chassis supporting a floor panel extending between said first and second margins, said portable platform including an apron panel operably, hingeably carried along said chassis second margin, said apron panel shiftable between a stowed position and a performance position wherein said apron panel comprises an extension to said floor panel.

8. The invention as claimed in claim 7, including at least one extension floor panel detachably receivable by said floor panel.

9. The invention as claimed in claim 1, including at least one retractable outrigger pivotally coupled to the chassis.

10. A portable platform for the performing arts or the like comprising:

a chassis having first and second side margins;

ground engaging wheels operably carried by the chassis for overland transportation of the chassis;

upright support means operably coupled to said chassis, said upright support means comprising weight bearing standards operably coupled to said chassis along said first side margin, said weight bearing standards each comprising an upright post member including an uppermost, inwardly angled cantilever arm;

articulated panel means operably coupled to said support means including a first panel operably, pivotally coupled to said cantilever arm and a second panel operably, pivotally coupled to said first panel; and means for selectively shifting said panel means between a stowed position wherein said first panel comprises a top wall and said second panel comprises a sidewall, and a performing position wherein said first and second panels comprise an overhead canopy extending over said chassis.

* * * * *